(12) United States Patent
Oinuma et al.

(10) Patent No.: US 11,314,060 B2
(45) Date of Patent: Apr. 26, 2022

(54) WIDE ANGLE LENS

(71) Applicant: AAC Optics Solutions Pte. Ltd., Singapore (SG)

(72) Inventors: Kenji Oinuma, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 246 days.

(21) Appl. No.: 16/686,204

(22) Filed: Nov. 17, 2019

(65) Prior Publication Data
US 2021/0041668 A1 Feb. 11, 2021

(30) Foreign Application Priority Data

Aug. 6, 2019 (CN) .......................... 201910719424.6

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ...... G02B 3/04; G02B 13/18; G02B 13/0045; G02B 9/64; G02B 9/62
USPC .......................... 359/756–758, 752, 658, 713
See application file for complete search history.

(56) References Cited

U.S. PATENT DOCUMENTS

| | | | | |
|---|---|---|---|---|
| 2014/0111872 A1* | 4/2014 | Tang | ................... | G02B 13/0045 359/713 |
| 2019/0113719 A1* | 4/2019 | Zhang | ................ | G02B 13/0045 |
| 2019/0121064 A1* | 4/2019 | Zhang | ...................... | G02B 9/62 |

FOREIGN PATENT DOCUMENTS

| | | |
|---|---|---|
| CN | 107003501 A | 8/2017 |
| CN | 108152921 A | 6/2018 |
| JP | 2015225102 A | 12/2015 |
| JP | 6175903 B2 | 8/2017 |
| JP | 6300183 B2 | 3/2018 |

OTHER PUBLICATIONS https://www.desmos.com/calculator, Graph calculator (Year: 2021).*

* cited by examiner

*Primary Examiner* — Travis S Fissel
(74) *Attorney, Agent, or Firm* — W&G Law Group

(57) ABSTRACT

The present invention discloses a wide angle lens. The wide angle lens comprises, from an object side in sequence: a first lens with a positive refractive power, a second lens with a negative refractive power, a third lens with a positive refractive power, a fourth lens with a negative refractive power, a fifth lens with a positive refractive power, and a sixth lens with a negative refractive power. The wide angel lens further satisfies specific conditions: $0.80 \leq f1/f \leq 1.50$, $-0.50 \leq f2/f3 \leq -0.05$, $1.15 \leq d1/d9 \leq 1.40$ and $T56min/d11 \geq 0.50$. The wide angle lens can achieve a high performance while obtaining a low TTL.

7 Claims, 9 Drawing Sheets

WIDE ANGLE LENS

FIELD OF THE PRESENT INVENTION

The present invention relates to a camera lens, in particular to a mobile phone camera assembly, a WEB camera lens, and so on, which are suitable for use with camera components such as a high-pixel CCD or CMOS. Meanwhile, the wide angle lens is consist of six lenses, which has excellent optical characteristics, TTL (optical total length)/IH (image height)$\leqslant$1.50, is ultra-thin and a F number (hereinafter referred as FNO) is less than 2.00.

DESCRIPTION OF RELATED ART

In recent years, various types of camera apparatuses using camera components such as CCD and CMOS have been widely used. With the development of miniaturization and high performance of these camera components, the society has demands on cameras lens with excellent optical characteristics, ultra-thin, and with bright FNO.

The development of technology related to a camera lens composed of six lenses which has excellent optical characteristics, ultra-thin, and bright FNO is progressing step by step. The proposed solution is that the wide angle lens is consist of six lenses, from an object side to an image side in sequence: a first lens with a positive refractive power, a second lens with a negative refractive power, a third lens with a positive refractive power, a fourth lens with a negative refractive power, a fifth lens with a positive refractive power, and a sixth lens with a negative refractive power.

DETAILED DESCRIPTION OF THE EXEMPLARY EMBODIMENTS

In order to make the objects, technical solutions, and advantages of the present invention more apparent, the embodiments of the present invention will be described in detail below, combined with the drawings. However, it will be apparent to the one skilled in the art that, in the various embodiments of the present invention, a number of technical details are presented in order to provide the reader with a better understanding of the invention. However, the technical solutions claimed in the present invention can be implemented without these technical details and can be implemented based on various changes and modifications to the following embodiments.

Embodiment 1

Figure 1:
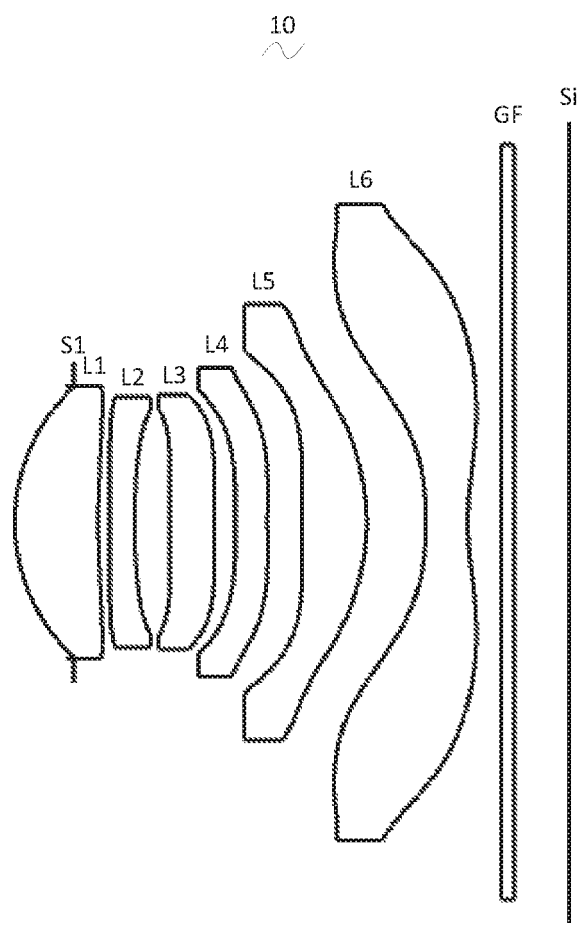
FIG. 1 is a schematic diagram of a structure of a wide angle lens in accordance with Embodiment 1 of the present invention.

As referring to accompany figures, the present invention provides a wide angle lens 10. FIG. 1 shows the wide angle lens 10 according to embodiment 1 of the present invention, and the wide angle lens 10 comprises six lenses. Specifically, from an object side to an image side, the wide angle lens 10 comprises in sequence: an aperture S1, a first lens L1, a second lens L2, a third lens L3, a fourth lens L4, a fifth lens L5, and a sixth lens L6. Optical elements like optical filter GF can be arranged between the sixth lens L6 and an image surface Si.

The first lens L1 is made of plastic material, the second lens L2 is made of plastic material, the third lens L3 is made of plastic material, the fourth lens L4 is made of plastic material, the fifth lens L5 is made of plastic material, and the sixth lens L6 is made of plastic material.

The first lens L1 has a positive refractive power, the second lens L2 has a negative refractive power, the third lens L3 has a positive refractive power, the fourth lens L4 has a negative refractive power, the five lens L5 has a positive refractive power, and the sixth lens L6 has a negative refractive power.

Here, a focal length of the wide angle lens 10 is defined as f, and a focal length of the first lens L1 is defined as f1. The wide angle lens 10 satisfies the following condition: $0.80 \leqslant f1/f \leqslant 1.50$, which specifies a ratio of the focal length f1 of the first lens L1 to the focal length f of the wide angle lens 10. The miniaturization of the wide angle lens is achieved by controlling a positive refractive power of the first lens L1 within a reasonable range.

A focal length of the second lens L2 is defined as f2, and a focal length of the third lens L3 is defined as f3. The wide angle lens 10 satisfies the following condition: $0.05 \leqslant f2/f3 \leqslant 0.20$, which specifies a ratio of the focal length f2 of the second lens L2 to the focal length f3 of the third lens L3. The refractive power is reasonably distributed so that the wide angle lens has a good imaging quality and lower sensitivity.

An on-axis thickness of the first lens L1 is defined as d1, and an on-axis thickness of the fifth lens L5 is defined as d9. The wide angle lens 10 satisfies $1.15 \leqslant d1/d9 \leqslant 1.40$, which specifies a ratio of the on-axis thickness of the first lens L1 to the on-axis thickness of the the fifth lens L5. When the value is out of the range, as the wide angle lens develops toward ultra-thin and wide-angle, it is difficult to correct an aberration.

A minimum interval distance between the image side surface of the fifth lens L5 and the object side surface of the sixth lens L6 along a direction parallel to the optical axis is defined as T56 min. In the present embodiment, T56 min is 0.463 mm, which is located at a height of 1.7 mm from the optical axis. An on-axis thickness of the sixth lens L6 is d11, and the wide angle lens 10 satisfies the following condition: T56 min/d11 ⩾ 0.50, when the value is within the range, it is beneficial for correcting the aberration of the system and improving image quality.

A total optical length from an object side surface of the first lens of the wide angle lens to the image surface of the wide angle lens along an optical axis is defined as TTL. When the focal length of the first lens, the whole focal length of the wide angle lens, the on-axis thickness of the first lens, the on-axis thickness of the fifth lens, the minimum interval distance between the image side surface of the fifth lens L5 and the object side surface of the sixth lens L6 along a direction parallel to the optical axis, and the on-axis thickness of the sixth lens of the present invention satisfy the above conditions, the wide angle lens 10 can have a high performance and satisfy the design requirement on wide angle and low TTL. Specifically, a focal length of the wide angle lens 10 is 4.261 mm, a total optical length from an object side surface of the first lens of the wide angle lens to an image surface of the wide angle lens along an optical axis TTL is 4.908 mm, a back focal length LB is 0.900 mm, an vision field angle is 77.55°, and an FNO is 1.801.

In the embodiment, the object side surface of the first lens L1 is convex in a paraxial region, an image side surface of the first lens L1 is concave in the paraxial region, and the first lens L1 has a positive refractive power, and the focal length f1 of the first lens is 3.789 mm.

An on-axis curvature radius of the object side surface of the first lens L1 is defined as R1, an on-axis curvature radius of the image side surface of the first lens L1 is defined as R2. The wide angle lens 10 satisfies the following condition: $-5.00 \leqslant (R1+R2)/(R1-R2) \leqslant -1.00$, which specifies a shape of the first lens L1. The first lens can effectively correct a spherical aberration of the system by reasonably controlling the shape of the first lens, and when the value is within the range, it is beneficial for achieving a wide angle and miniaturization under the condition of FNO lighting. Preferably, the following condition shall be satisfied, $-2.50 \leqslant (R1+R2)/(R1-R2) \leqslant -1.20$.

An object side surface of the second lens L2 is convex in the paraxial region, an image side surface of the second lens L2 is concave in the paraxial region, and the second lens L2 has a negative refractive power, and the focal length f2 of the second lens L2 is -10.757 mm.

The wide angle lens 10 satisfies the condition: $-1.00 \leqslant f1/f2 \leqslant -0.20$, which specifies a ratio of the focal length f1 of the first lens L1 to the focal length f2 of the second lens L2. The refractive power is reasonably distributed so that the system has a good imaging quality and lower sensitivity. Preferably, the following condition shall be satisfied, $-0.60 \leqslant f1/f2 \leqslant -0.20$.

An object side surface of the third lens L3 is convex in the paraxial region, an image side surface of the third lens L3 is concave in the paraxial region, and the third lens L3 has a positive refractive power, and the focal length f3 of the third lens is 52.737 mm.

An object side surface of fourth lens L4 is convex in the paraxial region, an image side surface of the fourth lens L4 is concave in the paraxial region, and the fourth lens L4 has a negative refractive power, and the focal length f4 of the fourth lens is -24.717 mm.

The wide angle lens satisfies the condition: $-20.00 \leqslant f4/f \leqslant -2.00$, and specifies a ratio of the focal length f4 of the fourth lens L4 to the focal length f of the wide angle lens 10. A miniaturization of the wide angle lens is achieved by controlling the negative refractive power of the fourth lens L4 being within a reasonable range. Preferably, the following condition shall be satisfied, $-12.00 \leqslant f4/f \leqslant -2.00$.

An object side surface of fifth lens L5 is convex in the paraxial region, an image side surface of the fifth lens L5 is convex in the paraxial region, and the fifth lens L5 has a positive refractive power, and the focal length f5 of the fifth lens is 3.148 mm.

An object side surface of sixth lens L6 is concave in the paraxial region, an image side surface of the sixth lens L6 is concave in the paraxial region, and the sixth lens L6 has a negative refractive power, and the focal length f6 of the sixth lens is -2.343 mm.

A vertical distance between an critical point of the image side surface of the sixth lens L6 and the optical axis is 0.975 mm. The total optical length TTL of the wide angle lens 10 is 4.908 mm. The wide angle lens satisfies the condition: $0.10 \leqslant Yc62/TTL \leqslant 0.55$, which specifies a ratio of a critical point position to the total optical length TTL. When the value is out of the range, it is difficult to correct an aberration and a distortion of the wide angle lens 10.

An FNO of the wide angle lens 10 is less than or equal to 2.00. The FNO is an F number of the wide angle lens 10, and when this condition is satisfied, the wide angle lens 10 can have a good brightness and a better night shooting effect, and satisfy the requirement on large aperture.

With such design, the total optical length TTL of the whole wide angle lens 10 can be made as short as possible, thus the miniaturization characteristics can be maintained and satisfy the demands on large aperture.

Preferably, the wide angle lens 10 satisfies the condition: T56 min/d11 ⩾ 1.00, and when the value is within the range, it is beneficial for correcting the aberration of the system and improving imaging quality.

In the following, examples will be used to describe the wide angle lens 10 of the present invention. The symbols recorded in each example are as follows. The unit of the focal length, on-axis distance, curvature radius, on-axis thickness, inflexion point position and critical point position is mm, and the unit of a whole picture angle is °.

f: focal length of the wide angle lens;
f1: focal length of the first lens L1;
f2: focal length of the second lens L2;
f3: focal length of the third lens L3;
f4: focal length of the fourth lens L4;
FNO: F number;
2ω: whole picture angel;
S1: Aperture;
R: curvature radius of an optical surface, the central curvature radius in case of lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;

R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of the lens and the distance on-axis between the lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface Si to the image surface of the optical filter GF to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF;
TTL: total optical length from the object side surface of the first lens of the wide angle lens to an image surface Si of the wide angle lens along an optical axis, the unit of TTL is mm;
LB: on-axis distance from the image side of the sixth lens L6 to the axis of the image surface Si (including a thickness of the optical filter GF);
IH: Image height;

$$y=(x^2/R)/[1+\{1-(k+1)(x^2R2)\}^{1/2}]+A4x^4+A6x^6+A8x^8+A10x^{10}+A12\ x^{12}+A14x^{14}A16x^{16}+A18^{18}+A20x^{20} \quad (1).$$

Wherein, K is a conic coefficient, A4, A6, A8, A10, A12, A14, A16, A18, and A20 are aspheric surface coefficient s. x is a vertical distance of the point on the aspheric curve and the optical axis, and y is a depth of the aspheric surface (the vertical distance between the point on the aspheric surface from the optical axis x and the tangent on the apex on the aspherical optical axis).

For convenience, the aspheric surface of each lens surface uses the aspheric surfaces shown in the above formula (1). However, the present invention is not limited to the aspherical polynomials form shown in the formula (1).

Preferably, inflexion points and/or arrest points can also be arranged on the object side surface and/or image side surface of the lens, so that the demand for high quality imaging can be satisfied, the description below can be referred for specific implementable scheme.

The design information of the wide angle lens 10 in Embodiment 1 of the present invention is shown in the tables 1 and 2.

TABLE 1

|  | R | d |  | nd |  | vd |
|---|---|---|---|---|---|---|
| S1 | ∞ | d0= | −0.520 |  |  |  |
| R1 | 1.594 | d1= | 0.736 | nd1 | 1.5439 v1 | 55.95 |
| R2 | 5.827 | d2= | 0.101 |  |  |  |
| R3 | 8.447 | d3= | 0.219 | nd2 | 1.6713 v2 | 19.24 |
| R4 | 3.872 | d4= | 0.310 |  |  |  |
| R5 | 10.357 | d5= | 0.401 | nd3 | 1.5439 v3 | 55.95 |
| R6 | 15.959 | d6= | 0.182 |  |  |  |
| R7 | 48.142 | d7= | 0.288 | nd4 | 1.6713 v4 | 19.24 |
| R8 | 12.395 | d8= | 0.305 |  |  |  |
| R9 | 25.644 | d9= | 0.570 | nd5 | 1.5439 v5 | 55.95 |
| R10 | −1.826 | d10= | 0.527 |  |  |  |
| R11 | −3.034 | d11= | 0.368 | nd6 | 1.5352 v6 | 56.12 |
| R12 | 2.240 | d12= | 0.300 |  |  |  |
| R13 | ∞ | d13= | 0.110 | ndg | 1.5168 vg | 64.17 |
| R14 | ∞ | d14= | 0.490 |  |  |  |

Table 2 shows the aspherical surface data of the wide angle lens 10 in the Embodiment 1 of the present invention.

TABLE 2

| | Conic coefficient | Aspherical surface coefficients | | | | | | |
|---|---|---|---|---|---|---|---|---|
|  | k | A4 | A6 | A8 | A10 | A12 | A14 | A16 |
| R1 | −1.4230E−03 | 3.8410E−03 | −1.0465E−02 | 1.5938E−02 | 2.0409E−02 | −7.3628E−02 | 6.8456E−02 | −2.1240E−02 |
| R2 | −4.4367E−01 | −1.0986E−01 | 1.3785E−01 | −1.1615E−01 | 6.4739E−02 | −2.7724E−02 | 7.4845E−03 | −1.6282E−03 |
| R3 | −5.7909E−01 | −2.1365E−01 | 3.4388E−01 | −1.4238E−01 | −4.6060E−01 | 1.3201E+00 | −1.8001E+00 | 1.4122E+00 |
| R4 | 1.1124E−01 | −1.4067E−01 | 2.5965E−01 | −1.0587E−01 | −5.9925E−02 | 7.9733E−02 | −1.3742E−02 | 8.3297E−03 |
| R5 | 9.4576E−01 | −9.6787E−02 | −3.2332E−01 | 1.9186E+00 | −6.3961E+00 | 1.2989E+01 | −1.6744E+01 | 1.3322E+01 |
| R6 | 5.9903E+00 | −1.7748E−01 | −2.8905E−04 | 4.5813E−01 | −1.4589E+00 | 2.1868E+00 | −2.0206E+00 | 1.2070E+00 |

TABLE 2-continued

| | Conic coefficient | Aspherical surface coefficients | | | | | | |
|---|---|---|---|---|---|---|---|---|
| | k | A4 | A6 | A8 | A10 | A12 | A14 | A16 |
| R7 | −2.4742E+02 | −3.1796E−01 | 1.7328E−01 | 4.9938E−02 | −2.2366E−01 | 2.3113E−01 | −3.2521E−01 | 3.5184E−01 |
| R8 | 2.5261E+00 | −2.7682E−01 | 7.9375E−02 | 1.5396E−01 | −2.4582E−01 | 1.6481E−01 | −6.7596E−02 | 2.1476E−02 |
| R9 | 4.8104E+00 | −5.0446E−02 | −1.1556E−01 | 3.4127E−02 | 9.8794E−02 | −1.2638E−01 | 7.1652E−02 | −2.4513E−02 |
| R10 | −2.9832E+00 | 4.4122E−02 | −1.1838E−01 | 6.5669E−02 | −1.7137E−02 | 9.8329E−03 | −5.9724E−03 | 1.7125E−03 |
| R11 | −3.0068E+00 | −1.7462E−01 | 7.7134E−02 | −9.1244E−03 | −8.8196E−04 | 2.0451E−04 | 3.0225E−05 | −1.0756E−05 |
| R12 | −1.6217E+01 | −1.1920E−01 | 6.5648E−02 | −2.5435E−02 | 6.5230E−03 | −1.0913E−03 | 1.1214E−04 | −6.4193E−06 |

Figure 2:
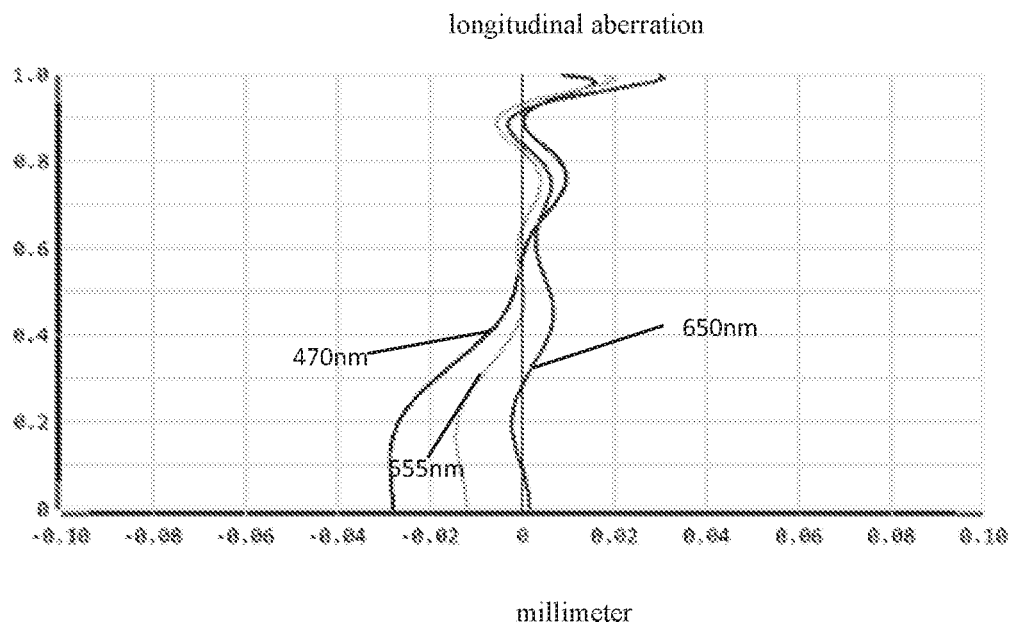
FIG. 2 is a schematic diagram of a longitudinal aberration of the wide angle lens shown in FIG. 1.
Figure 3:
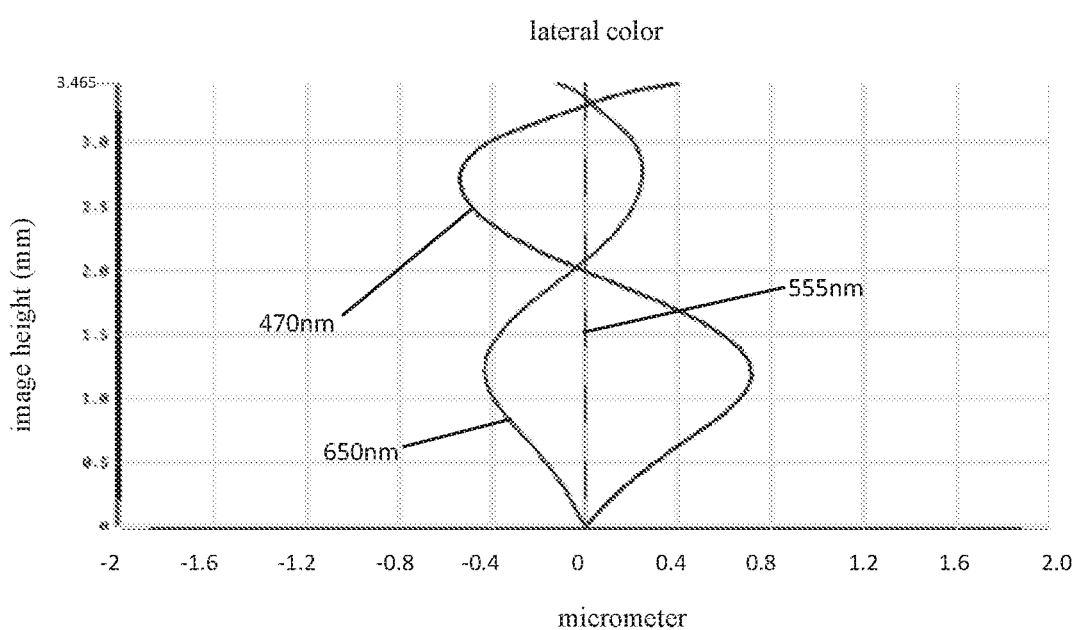
FIG. 3 is a schematic diagram of a lateral color of the wide angle lens shown in FIG. 1.
Figure 4:
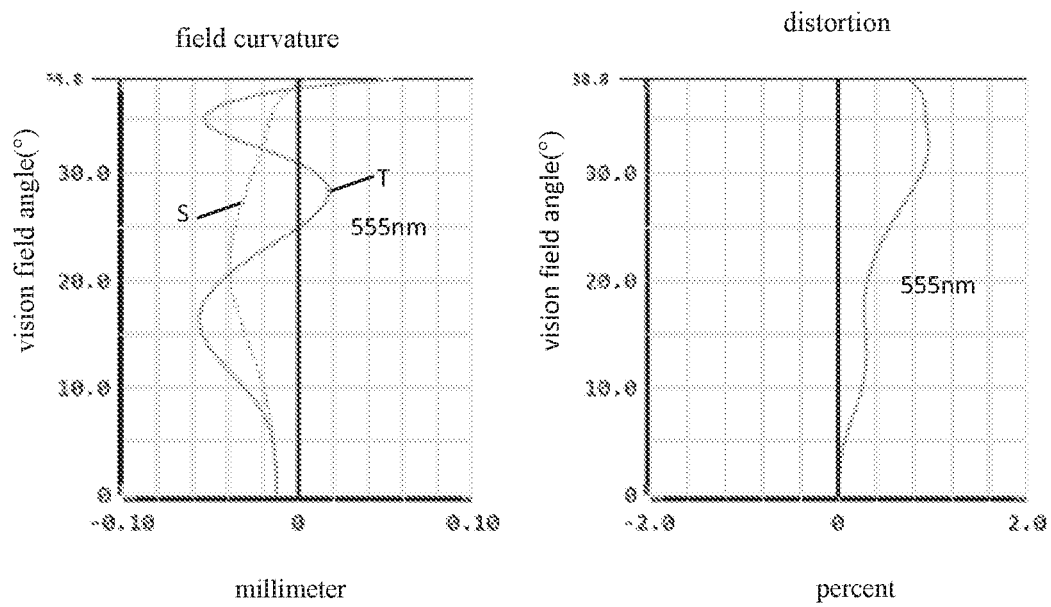
FIG. 4 is a schematic diagram of a field curvature and a distortion of the wide angle lens shown in FIG. 1.
Figure 5:
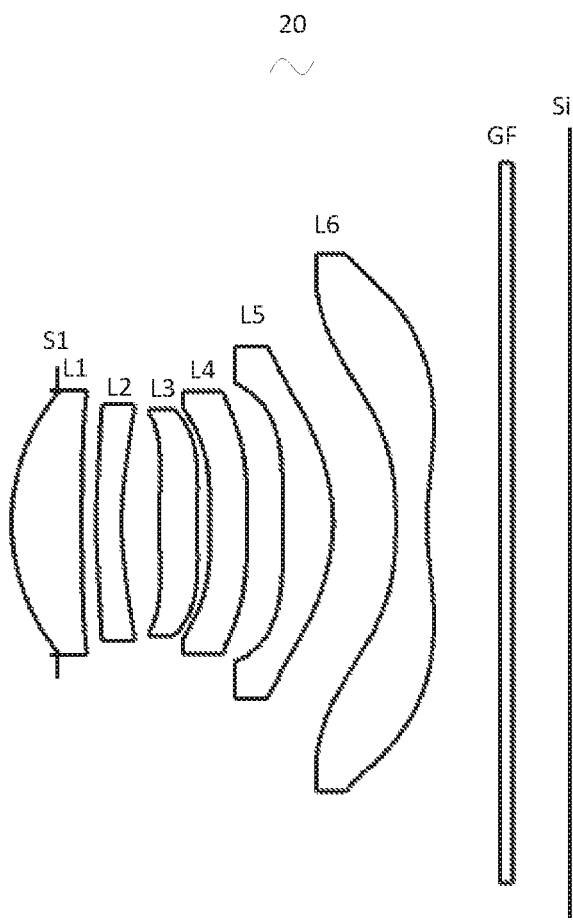
FIG. 5 is a schematic diagram of a structure of a wide angle lens in accordance with Embodiment 2 of the present invention.

FIG. 2 and FIG. 3 respectively illustrate a longitudinal aberration and a lateral color of light with wavelengths of 470 nm, 555 nm and 650 nm after passing the wide angle lens 10 according to Embodiment 1. FIG. 4 illustrates a field curvature and a distortion of light with a wavelength of 555 nm after passing the wide angle lens 10 according to Embodiment 1, in which a field curvature S is a field curvature in a sagittal direction and T is a field curvature in a tangential direction.

Table 9 described below shows the various values of the Embodiments 1, 2, 3 and the values corresponding to the parameters which are specified in the conditions.

As shown in Table 9, Embodiment 1 satisfies the above conditions.

In this embodiment, an entrance pupil diameter ENPD of the wide angle lens is 2.366 mm. An image height of 1.0H is 3.465 mm. An FOV 2ω is 77.55°. Thus, the wide angle lens has a wide-angle and is ultra-thin. It's on-axis and off-axis chromatic aberrations are fully corrected, thereby achieving excellent optical characteristics.

Embodiment 2

Embodiment 2 is basically the same as Embodiment 1, the meaning of its symbols is the same as that of Embodiment 1, in the following, only the differences are listed.

Table 3 and table 4 show the design data of a wide angle lens 20 in Embodiment 2 of the present invention.

TABLE 3

| | R | d | | nd | | vd |
|---|---|---|---|---|---|---|
| S1 | ∞ | d0= | −0.400 | | | |
| R1 | 1.797 | d1= | 0.614 | nd1 | 1.5439 | v1 | 55.95 |
| R2 | 11.225 | d2= | 0.129 | | | |
| R3 | 4.325 | d3= | 0.220 | nd2 | 1.6713 | v2 | 19.24 |
| R4 | 2.572 | d4= | 0.332 | | | |
| R5 | 9.095 | d5= | 0.334 | nd3 | 1.5439 | v3 | 55.95 |
| R6 | 11.263 | d6= | 0.114 | | | |
| R7 | −21.816 | d7= | 0.321 | nd4 | 1.6713 | v4 | 19.24 |
| R8 | −331.005 | d8= | 0.317 | | | |
| R9 | −26.683 | d9= | 0.440 | nd5 | 1.5439 | v5 | 55.95 |
| R10 | −1.600 | d10= | 0.552 | | | |
| R11 | −4.226 | d11= | 0.270 | nd6 | 1.5352 | v6 | 56.12 |
| R12 | 2.282 | d12= | 0.644 | | | |
| R13 | ∞ | d13= | 0.110 | ndg | 1.5168 | vg | 64.17 |
| R14 | ∞ | d14= | 0.500 | | | |

Table 4 shows the aspherical surface data of each lens of the wide angle lens 20 in Embodiment 2 of the present invention.

TABLE 4

| | Conic coefficient | Aspherical surface coefficients | | | |
|---|---|---|---|---|---|
| | k | A4 | A6 | A8 | A10 |
| R1 | −3.1877E−02 | −7.3140E−04 | −4.9685E−03 | 9.8774E−04 | 2.7979E−02 |
| R2 | 4.2741E+01 | −8.7465E−02 | 1.4201E−01 | −1.2843E−01 | 7.0731E−02 |
| R3 | 1.9060E+00 | −2.2498E−01 | 3.1605E−01 | −1.3175E−01 | −4.7093E−01 |
| R4 | −7.6850E+00 | −1.4886E−01 | 2.3591E−01 | −1.8177E−01 | −2.3979E−02 |
| R5 | −4.4294E+02 | −3.8186E−02 | −3.9200E−01 | 1.8949E+00 | −6.3509E+00 |
| R6 | −4.1681E+00 | −2.4248E−01 | −4.2826E−02 | 4.7623E−01 | −1.4525E+00 |
| R7 | 0.0000E+00 | −3.6181E−01 | 1.7592E−01 | 7.8506E−02 | −2.2522E−01 |
| R8 | 0.0000E+00 | −2.6205E−01 | 8.4665E−02 | 1.5365E−01 | −2.3930E−01 |
| R9 | 0.0000E+00 | −6.2058E−02 | −1.2164E−01 | 4.6509E−02 | 8.3262E−02 |
| R10 | −2.5917E+00 | 4.9769E−02 | −1.1364E−01 | 6.6803E−02 | −1.6716E−02 |
| R11 | −2.9679E+00 | −1.7326E−01 | 7.6701E−02 | −9.2220E−03 | −9.1651E−04 |
| R12 | −1.6526E+01 | −1.3070E−01 | 6.5647E−02 | −2.5367E−02 | 6.5266E−03 |

| | Aspherical surface coefficients | | | | |
|---|---|---|---|---|---|
| | A12 | A14 | A16 | A18 | A20 |
| R1 | −6.9724E−02 | 6.8304E−02 | −2.2715E−02 | −3.0904E−03 | 2.3802E−03 |
| R2 | −2.2637E−02 | 8.0485E−03 | −2.5460E−03 | −2.3042E−04 | −2.4184E−04 |
| R3 | 1.3169E+00 | −1.7963E+00 | 1.4119E+00 | −5.9870E−01 | 1.0537E−01 |
| R4 | 1.2655E−01 | −2.2845E−02 | −4.8155E−02 | −4.0644E−02 | 6.2890E−02 |
| R5 | 1.3004E+01 | −1.6737E+01 | 1.3265E+01 | −5.9816E+00 | 1.1876E+00 |
| R6 | 2.1820E+00 | −2.0255E+00 | 1.2180E+00 | −4.2394E−01 | 5.6877E−02 |
| R7 | 2.3228E−01 | −3.2146E−01 | 3.6423E−01 | −1.6174E−01 | 1.4562E−02 |
| R8 | 1.6769E−01 | −6.9874E−02 | 1.7488E−02 | −6.0595E−03 | 4.1167E−03 |
| R9 | −1.3097E−01 | 7.2671E−02 | −2.3739E−02 | 5.1062E−03 | −7.8602E−04 |
| R10 | 9.8183E−03 | −6.0975E−03 | 1.6547E−03 | −2.2549E−04 | 1.4151E−05 |
| R11 | 2.0882E−04 | 3.2024E−05 | −1.0776E−05 | 1.0251E−06 | −3.6305E−08 |
| R12 | −1.0953E−03 | 1.1132E−04 | −6.4040E−06 | 1.8185E−07 | 5.0717E−09 |

Figure 6:
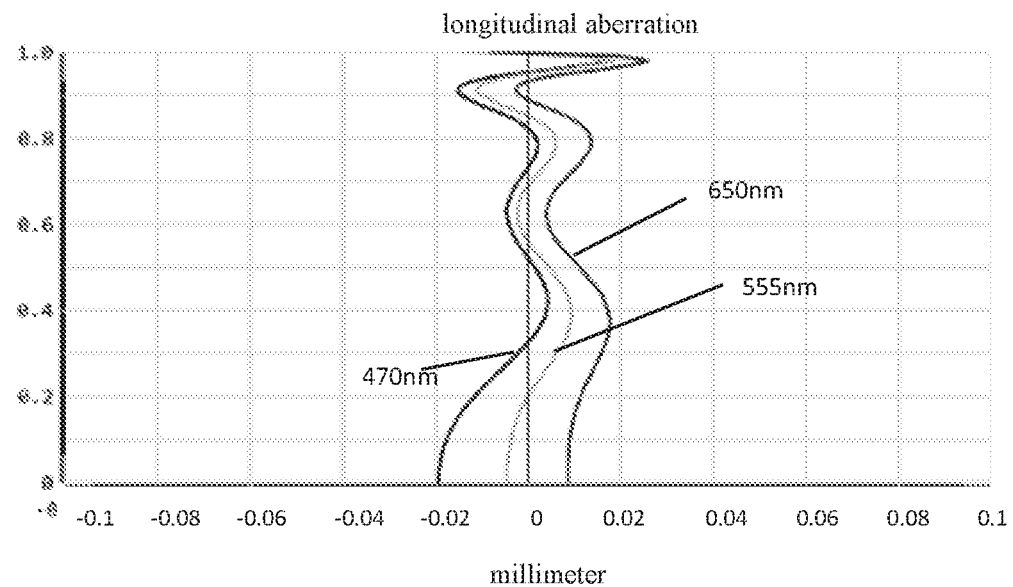
FIG. 6 is a schematic diagram of a longitudinal aberration of the wide angle lens shown in FIG. 5.
Figure 7:
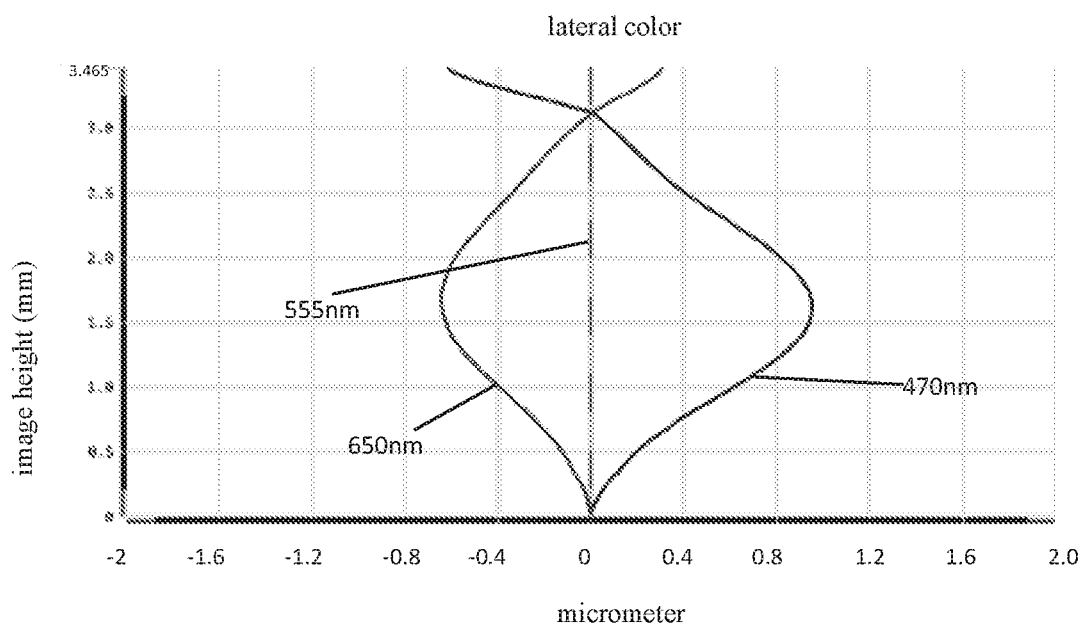
FIG. 7 is a schematic diagram of a lateral color of the wide angle lens shown in FIG. 5.
Figure 8:
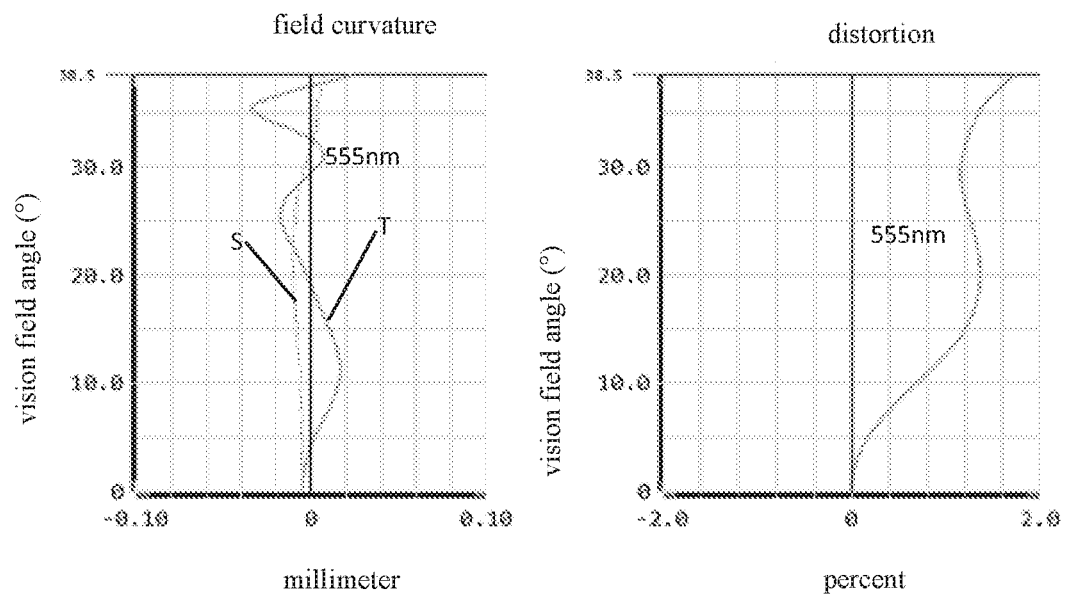
FIG. 8 is a schematic diagram of a field curvature and a distortion of the wide angle lens shown in FIG. 5.
Figure 9:
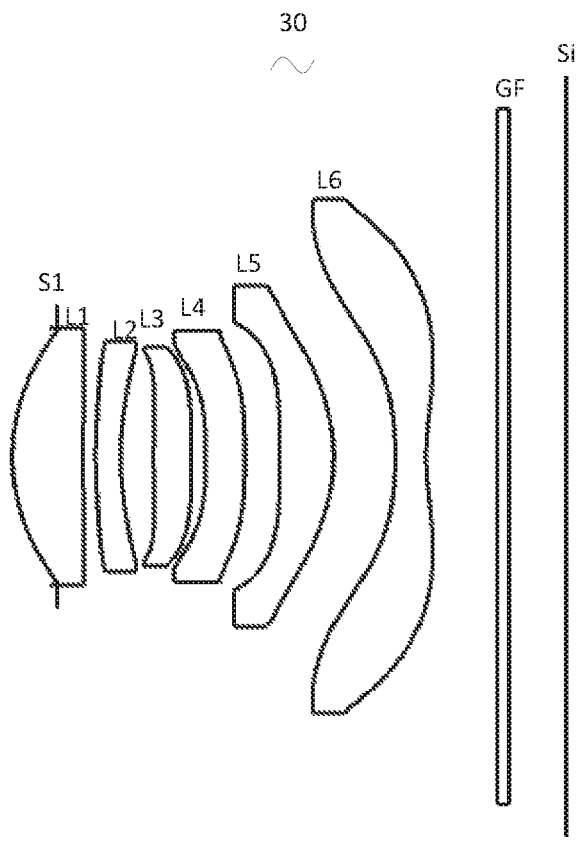
FIG. 9 is a schematic diagram of a structure of a wide angle lens in accordance with Embodiment 3 of the present invention.

FIG. 6 and FIG. 7 respectively illustrate a longitudinal aberration and a lateral color of light with wavelengths of 470 nm, 555 nm and 650 nm after passing the wide angle lens 20 according to Embodiment 2. FIG. 8 illustrates a field curvature and a distortion of light with a wavelength of 555 nm after passing the wide angle lens 20 according to Embodiment 2, in which a field curvature S is a field curvature in a sagittal direction and T is a field curvature in a tangential direction.

As shown in Table 9, Embodiment 2 satisfies the above conditions.

In this embodiment, the focal length f1 of the first lens L1 is 3.833 mm. The focal length f2 of the second lens L2 is −9.868 mm. The focal length f3 of the third lens L3 is 82.107 mm. The focal length f4 of the fourth lens L4 is −34.485 mm. The focal length f5 of the fifth lens L5 is 3.100 mm. The focal length f6 of the sixth lens L6 is −2.720 mm, and the vertical distance Yc62 between the arrest point of the image side surface of the sixth lens L6 and the optical axis is 0.875 mm.

In this embodiment, the object side surface of the fourth lens L4 is a concave surface, the image side surface of the fourth lens L4 is a convex surface, and the object side surface of the fifth lens L5 is a concave surface. The T56 min located at the optical axis is 0.552 mm.

The focal length of the wide angle lens 10 is 4.275 mm. The total optical length TTL is 4.896 mm. The back focal LB is 1.254 mm, the FNO is 1.840. The entrance pupil diameter ENPD of the wide angle lens is 2.323 mm. The image height of 1.0H is 3.465 mm. The FOV 2ω is 77.00°. Thus, the wide angle lens has a wide-angle and is ultra-thin and its on-axis and off-axis chromatic aberrations are fully corrected, thereby achieving excellent optical characteristics.

Embodiment 3

Embodiment 3 is basically the same as Embodiment 1, the meaning of its symbols is the same as that of Embodiment 1, in the following, only the differences are listed.

Table 5 and table 6 show the design data of a wide angle lens 30 in Embodiment 3 of the present invention.

TABLE 5

|     | R       | d    |        | nd     |     | vd    |
| --- | ------- | ---- | ------ | ------ | --- | ----- |
| S1  | ∞       | d0=  | −0.395 |        |     |       |
| R1  | 1.754   | d1=  | 0.626  | nd1    | 1.5439 | v1 | 55.95 |
| R2  | 15.887  | d2=  | 0.115  |        |     |       |
| R3  | 4.682   | d3=  | 0.220  | nd2    | 1.6713 | v2 | 19.24 |
| R4  | 2.495   | d4=  | 0.294  |        |     |       |
| R5  | 8.068   | d5=  | 0.328  | nd3    | 1.5439 | v3 | 55.95 |
| R6  | 38.142  | d6=  | 0.134  |        |     |       |
| R7  | −5.799  | d7=  | 0.341  | nd4    | 1.6713 | v4 | 19.24 |
| R8  | −17.114 | d8=  | 0.310  |        |     |       |
| R9  | −20.082 | d9=  | 0.482  | nd5    | 1.5439 | v5 | 55.95 |
| R10 | −1.562  | d10= | 0.542  |        |     |       |
| R11 | −4.016  | d11= | 0.274  | nd6    | 1.5352 | v6 | 56.12 |
| R12 | 2.309   | d12= | 0.629  |        |     |       |
| R13 | ∞       | d13= | 0.110  | ndg    | 1.5168 | vg | 64.17 |
| R14 | ∞       | d14= | 0.500  |        |     |       |

Table 6 shows the aspherical surface data of each lens of the wide angle lens 30 in Embodiment 3 of the present invention.

TABLE 6

| | Conic coefficient | Aspherical surface coefficients | | | |
| --- | --- | --- | --- | --- | --- |
| | k | A4 | A6 | A8 | A10 |
| R1 | −6.3924E−02 | −1.0006E−03 | −8.0091E−03 | −1.6555E−04 | 2.6617E−02 |
| R2 | 1.2625E+02 | −8.1229E−02 | 1.3595E−01 | −1.3262E−01 | 7.0119E−02 |
| R3 | 8.0662E+00 | −2.0485E−01 | 3.1663E−01 | −1.3591E−01 | −4.7228E−01 |
| R4 | −6.4584E+00 | −1.3570E−01 | 2.4367E−01 | −1.8579E−01 | −2.6354E−02 |
| R5 | −3.6298E+02 | −3.5332E−02 | −3.9206E−01 | 1.8921E+00 | −6.3538E+00 |
| R6 | 1.1500E+03 | −2.3168E−01 | −4.3272E−02 | 4.7730E−01 | −1.4484E+00 |
| R7 | 0.0000E+00 | −3.6175E−01 | 1.8230E−01 | 8.5349E−02 | −2.2549E−01 |
| R8 | 0.0000E+00 | −2.5994E−01 | 8.4539E−02 | 1.5316E−01 | −2.3952E−01 |
| R9 | 0.0000E+00 | −6.2747E−02 | −1.2197E−01 | 4.6606E−02 | 8.3528E−02 |
| R10 | −2.5766E+00 | 4.9570E−02 | −1.1368E−01 | 6.6785E−02 | −1.6731E−02 |
| R11 | −2.8303E+00 | −1.7336E−01 | 7.6700E−02 | −9.2205E−03 | −9.1625E−04 |
| R12 | −1.8066E+01 | −1.3093E−01 | 6.5668E−02 | −2.5361E−02 | 6.5273E−03 |

| | Aspherical surface coefficients | | | | |
| --- | --- | --- | --- | --- | --- |
| | A12 | A14 | A16 | A18 | A20 |
| R1 | −7.0500E−02 | 6.7960E−02 | −2.2801E−02 | −3.1375E−03 | 2.2158E−03 |
| R2 | −2.2860E−02 | 7.5340E−03 | −3.1107E−03 | −4.2862E−04 | 2.3368E−04 |
| R3 | 1.3192E+00 | −1.7930E+00 | 1.4143E+00 | −5.9848E−01 | 1.0303E−01 |
| R4 | 1.2874E−01 | −1.9902E−02 | −4.6184E−02 | −4.1452E−02 | 6.1956E−02 |
| R5 | 1.3001E+01 | −1.6738E+01 | 1.3264E+01 | −5.9812E+00 | 1.1898E+00 |
| R6 | 2.1827E+00 | −2.0295E+00 | 1.2129E+00 | −4.2533E−01 | 6.2931E−02 |
| R7 | 2.2579E−01 | −3.2209E−01 | 3.7169E−01 | −1.5442E−01 | 8.8532E−03 |
| R8 | 1.6786E−01 | −6.9444E−02 | 1.7899E−02 | −5.8542E−03 | 4.3639E−03 |
| R9 | −1.3077E−01 | 7.2807E−02 | −2.3641E−02 | 5.1743E−03 | −7.1325E−04 |
| R10 | 9.8112E−03 | −6.0995E−03 | 1.6548E−03 | −2.2450E−04 | 1.4890E−05 |
| R11 | 2.0876E−04 | 3.1998E−05 | −1.0785E−05 | 1.0231E−06 | −3.6595E−08 |
| R12 | −1.0953E−03 | 1.1131E−04 | −6.4101E−06 | 1.7995E−07 | 4.6474E−09 |

Figure 10:
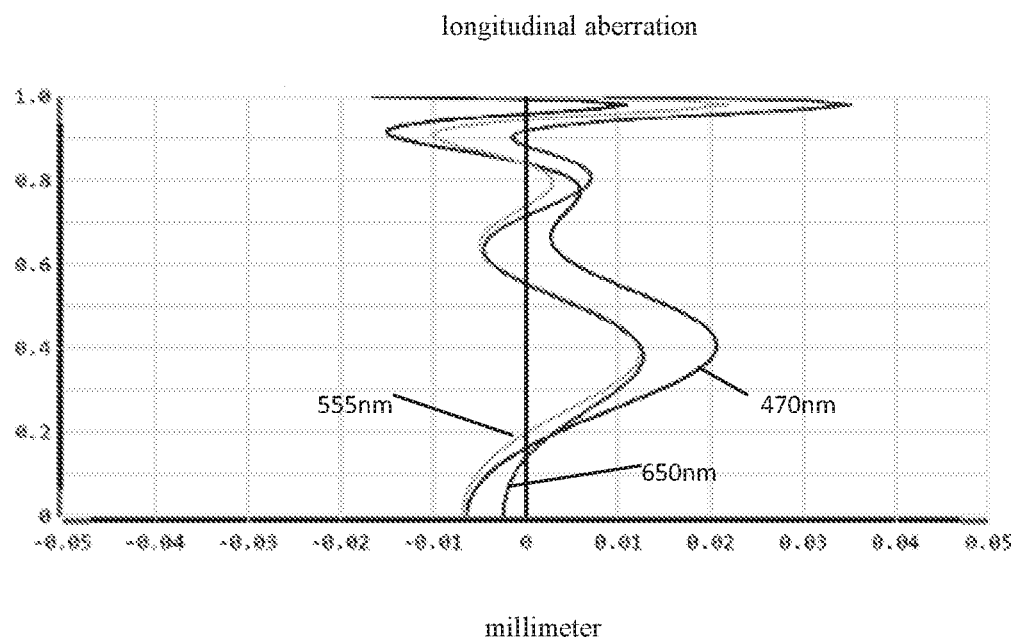
FIG. 10 is a schematic diagram of a longitudinal aberration of the wide angle lens shown in FIG. 9.
Figure 11:
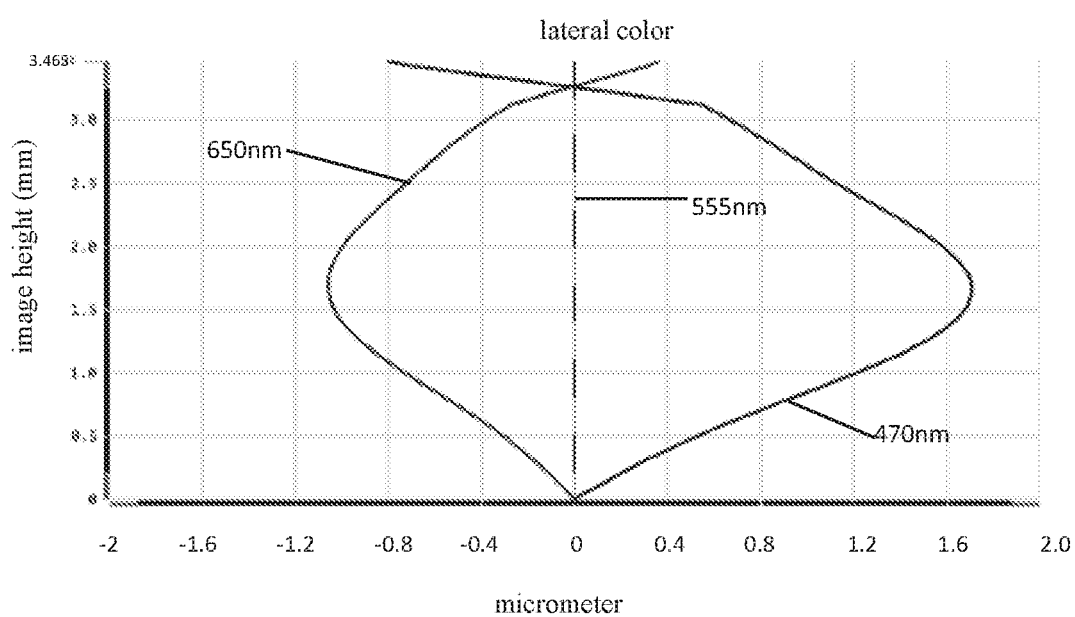
FIG. 11 is a schematic diagram of a lateral color of the wide angle lens shown in FIG. 9.
Figure 12:
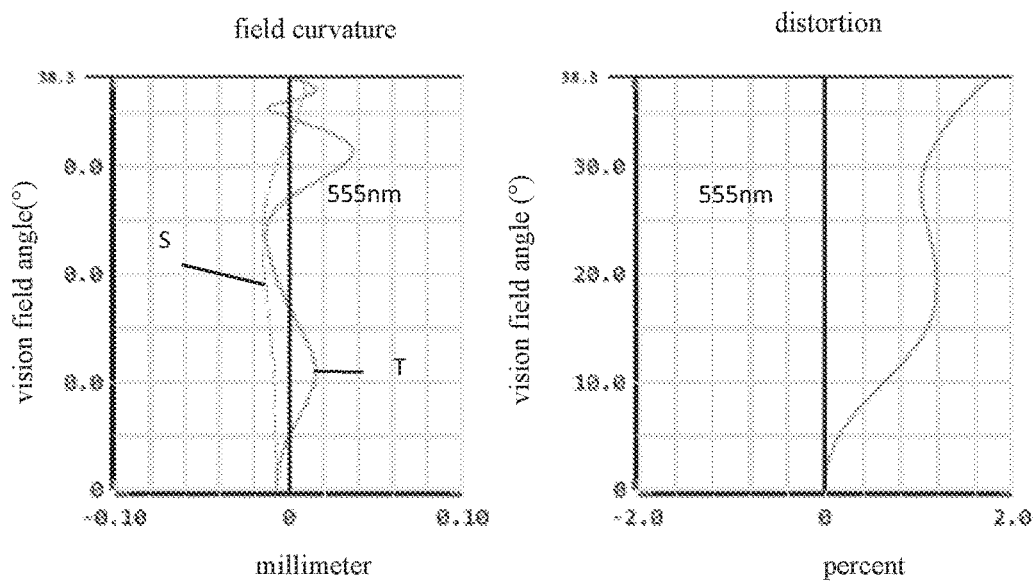
FIG. 12 is a schematic diagram of a field curvature and a distortion of the wide angle lens shown in FIG. 9.
Figure 13:
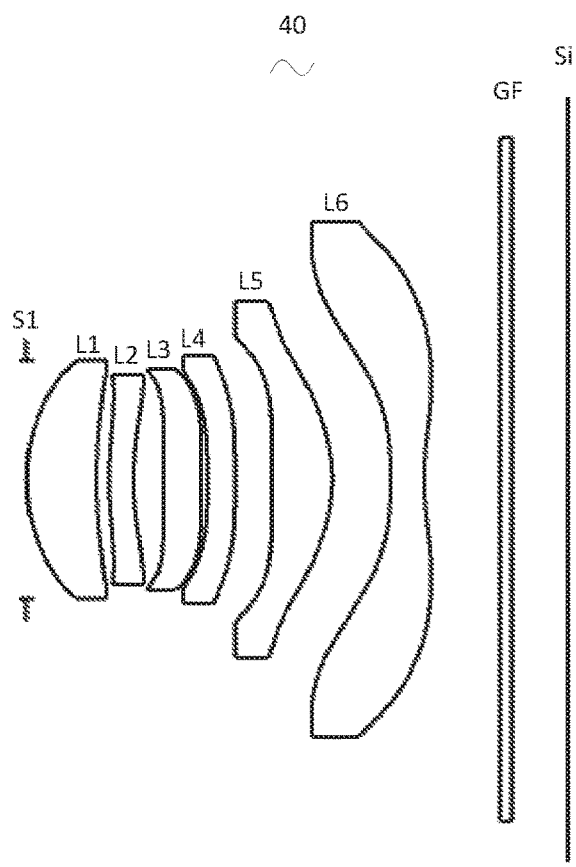
FIG. 13 is a schematic diagram of a structure of a wide angle lens in accordance with Embodiment 4 of the present invention.

FIG. 10 and FIG. 11 respectively illustrate a longitudinal aberration and a lateral color of light with wavelengths of 470 nm, 555 nm and 650 nm after passing the wide angle lens 30 according to Embodiment 3. FIG. 12 illustrates a field curvature and a distortion of light with a wavelength of 555 nm after passing the wide angle lens 30 according to Embodiment 3, in which a field curvature S is a field curvature in a sagittal direction and T is a field curvature in a tangential direction.

The following table 9, in accordance with the above conditions, lists the values in this embodiment corresponding to each condition. Apparently, the wide angle lens of this embodiment satisfies the above conditions.

In this embodiment, the focal length f1 of the first lens L1 is 3.559 mm. The focal length f2 of the second lens L2 is −8.216 mm. The focal length f3 of the third lens L3 is 18.679 mm. The focal length f4 of the fourth lens L4 is −13.104 mm. The focal length f5 of the fifth lens L5 is 3.076 mm. The focal length f6 of the sixth lens L6 is −2.690 mm, and the vertical distance between the critical point of the image side surface of the sixth lens L6 and the optical axis is 0.855 mm.

In this embodiment, the object side surface of the fourth lens L4 is a concave surface, the image side surface of the fourth lens L4 is a convex surface, and the object side surface of the fifth lens L5 is a concave surface. The T56 min located at the optical axis is 0.542 mm.

In this embodiment, the focal length of the wide angle lens 10 is 4.295 mm. The total optical length TTL is 4.904 mm. The back focal length LB is 1.239 mm. The FNO is 1.840. The entrance pupil diameter ENPD of the wide angle lens is 2.334 mm. The image height of 1.0H is 3.465 mm, The FOV 2ω is 76.68°. Thus, the wide angle lens has a wide-angle and is ultra-thin. It's on-axis and off-axis chromatic aberrations are fully corrected, thereby achieving excellent optical characteristics.

Embodiment 4

Embodiment 4 is basically the same as Embodiment 1, the meaning of its symbols are the same as that of Embodiment 1, in the following, only the differences are listed.

Table 7 and table 8 show the design data of a wide angle lens 40 lens in Embodiment 4 of the present invention.

TABLE 7

|  | R | d | nd |  | vd |  |
|---|---|---|---|---|---|---|
| S1 | ∞ | d0= | 0.000 |  |  |  |
| R1 | 1.674 | d1= | 0.621 | nd1 | 1.5439 | v1 | 55.95 |
| R2 | 4.025 | d2= | 0.114 |  |  |  |
| R3 | 3.303 | d3= | 0.220 | nd2 | 1.6713 | v2 | 19.24 |
| R4 | 2.631 | d4= | 0.262 |  |  |  |
| R5 | 14.921 | d5= | 0.339 | nd3 | 1.5439 | v3 | 55.95 |
| R6 | 15.997 | d6= | 0.058 |  |  |  |
| R7 | −88.717 | d7= | 0.245 | nd4 | 1.6713 | v4 | 19.24 |
| R8 | 41.819 | d8= | 0.333 |  |  |  |
| R9 | −4128.897 | d9= | 0.531 | nd5 | 1.5439 | v5 | 55.95 |
| R10 | −1.511 | d10= | 0.524 |  |  |  |
| R11 | −4.117 | d11= | 0.294 | nd6 | 1.5352 | v6 | 56.12 |
| R12 | 2.214 | d12= | 0.678 |  |  |  |
| R13 | ∞ | d13= | 0.110 | ndg | 1.5168 | vg | 64.17 |
| R14 | ∞ | d14= | 0.500 |  |  |  |

Table 8 shows the aspherical surface data of each lens of the wide angle lens 40 in Embodiment 4 of the present invention.

TABLE 8

| | Conic coefficient | Aspherical surface coefficients | | | |
|---|---|---|---|---|---|
| | k | A4 | A6 | A8 | A10 |
| R1 | 2.1487E−01 | −8.6894E−06 | 1.3297E−03 | −5.0926E−03 | 3.2695E−02 |
| R2 | −7.5946E+00 | −8.6826E−02 | 1.4909E−01 | −1.5079E−01 | 5.2798E−02 |
| R3 | 2.2267E+00 | −2.3029E−01 | 2.6215E−01 | −1.7028E−01 | −4.6799E−01 |
| R4 | −5.0250E+00 | −1.3509E−01 | 2.0541E−01 | −1.9384E−01 | −2.4808E−02 |
| R5 | −1.6830E+03 | −3.7046E−02 | −3.7938E−01 | 1.9012E+00 | −6.3585E+00 |
| R6 | 1.1267E+02 | −2.2785E−01 | −5.0450E−02 | 4.7891E−01 | −1.4506E+00 |
| R7 | −6.6974E+02 | −3.6131E−01 | 1.7609E−01 | 7.9447E−02 | −2.2517E−01 |
| R8 | 0.0000E+00 | −2.6178E−01 | 8.5136E−02 | 1.5468E−01 | −2.3900E−01 |
| R9 | 0.0000E+00 | −3.7251E−02 | −1.2084E−01 | 4.8609E−02 | 8.5149E−02 |
| R10 | −2.3693E+00 | 5.2713E−02 | −1.0994E−01 | 6.6950E−02 | −1.6789E−02 |
| R11 | −1.9065E+00 | −1.7386E−01 | 7.6933E−02 | −9.1658E−03 | −9.1060E−04 |
| R12 | −1.6827E+01 | −1.2657E−01 | 6.5661E−02 | −2.5349E−02 | 6.5348E−03 |

| | Aspherical surface coefficients | | | | |
|---|---|---|---|---|---|
| | A12 | A14 | A16 | A18 | A20 |
| R1 | −6.2117E−02 | 6.9335E−02 | −2.9092E−02 | −9.5101E−03 | 1.1145E−02 |
| R2 | −1.4331E−02 | 3.9517E−02 | −6.4888E−03 | −1.6275E−02 | 1.6320E−02 |
| R3 | 1.3446E+00 | −1.7920E+00 | 1.4047E+00 | −6.0342E−01 | 1.0960E−01 |
| R4 | 1.1364E−01 | −2.8118E−02 | −4.6578E−02 | −4.1172E−02 | 6.5389E−02 |
| R5 | 1.2987E+01 | −1.6763E+01 | 1.3243E+01 | −5.9868E+00 | 1.2316E+00 |
| R6 | 2.1795E+00 | −2.0288E+00 | 1.2163E+00 | −4.2299E−01 | 5.4892E−02 |
| R7 | 2.3276E−01 | −3.2151E−01 | 3.5860E−01 | −1.6668E−01 | 1.1939E−02 |
| R8 | 1.6719E−01 | −7.0619E−02 | 1.7084E−02 | −6.1669E−03 | 4.3827E−03 |
| R9 | −1.3019E−01 | 7.3144E−02 | −2.3304E−02 | 5.4186E−03 | −6.1910E−04 |
| R10 | 9.8031E−03 | −6.0935E−03 | 1.6591E−03 | −2.2242E−04 | 1.5544E−05 |
| R11 | 2.0921E−04 | 3.1966E−05 | −1.0803E−05 | 1.0173E−06 | −3.8362E−08 |
| R12 | −1.0941E−03 | 1.1136E−04 | −6.4255E−06 | 1.7369E−07 | 3.0508E−09 |

Figure 14:
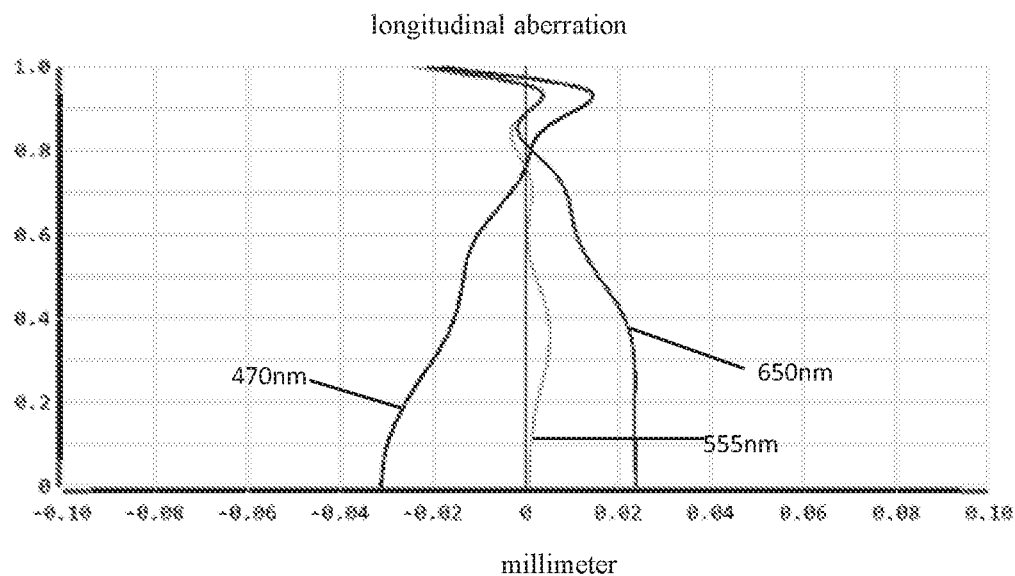
FIG. 14 shows a schematic diagram of a longitudinal aberration of the wide angle lens shown in FIG. 13.
Figure 15:
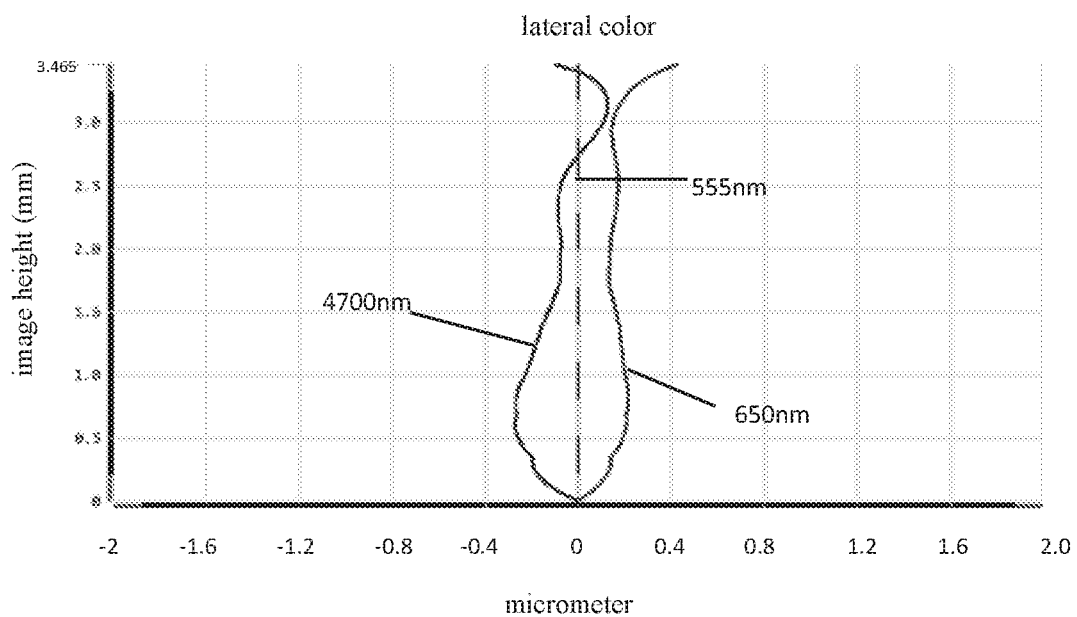
FIG. 15 shows a schematic diagram of a lateral color of the wide angle lens shown in FIG. 13.
Figure 16:
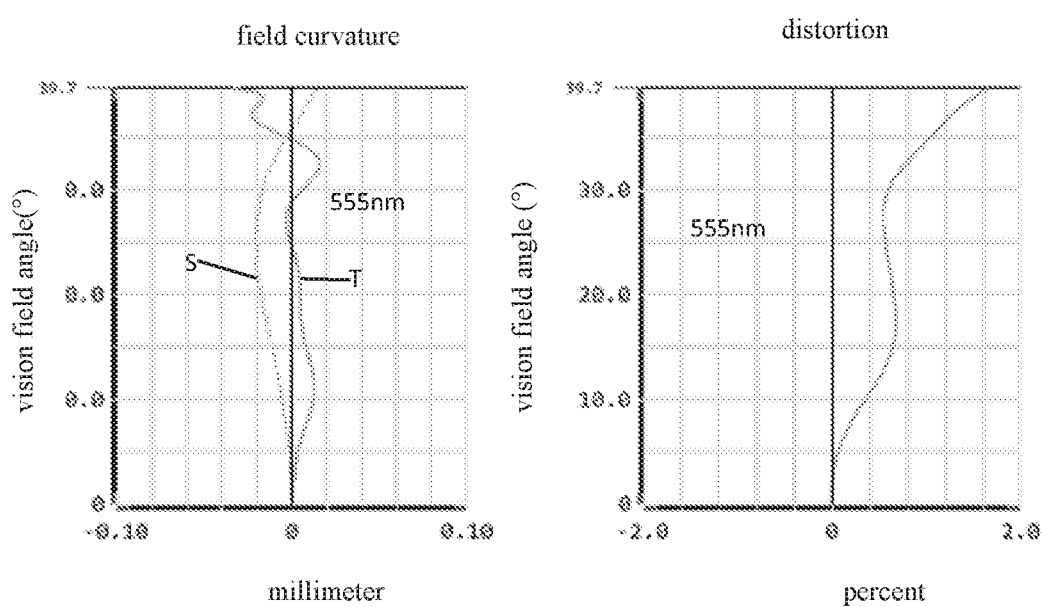
FIG. 16 shows a schematic diagram of a field curvature and a distortion of the wide angle lens shown in FIG. 13.

FIG. 14 and FIG. 15 respectively illustrate a longitudinal aberration and a lateral color of light with wavelengths of 470 nm, 555 nm and 650 nm after passing the wide angle lens 40 according to Embodiment 4. FIG. 16 illustrates a field curvature and a distortion of light with a wavelength of 555 nm after passing the wide angle lens 40 according to Embodiment 4, in which a field curvature S is a field curvature in a sagittal direction and T is a field curvature in a tangential direction.

The following table 9, in accordance with the above conditions, lists the values in this embodiment corresponding to each condition. Apparently, the camera optical lens of this embodiment satisfies the above conditions.

In this embodiment, the focal length f1 of the first lens L1 is 4.803 mm. The focal length f2 of the second lens L2 is −22.014 mm. The focal length f3 of the third lens L3 is 365.803 mm. The focal length f4 of the fourth lens L4 is −41.917 mm. The focal length f5 of the fifth lens is 2.769 mm. The focal length f6 of the sixth lens L6 is −2.639 mm, and the vertical distance Yc62 between the critical point of the image side of the sixth lens L6 and the optical axis is 0.905 mm.

In this embodiment, the object side surface of the fourth lens L4 is a concave surface and the image side surface of the fourth lens L4 is a concave surface. The object side surface of the fifth lens L5 is a concave surface, the T56 min located at a height of 1.6 mm from the optical axis is 0.504 mm.

In this embodiment, the whole focal length of the wide angle lens 10 is 4.104 mm. The total optical length TTL is 4.829 mm. The back focal length LB is 1.288 mm. The FNO is 1.885. The entrance pupil diameter ENPD of the wide angle lens is 2.177 mm. The image height of 1.0H is 3.465 mm. The FOV 2ω is 79.44°. Thus, the wide angle lens has a wide-angle and is ultra-thin and its on-axis and off-axis chromatic aberrations are fully corrected, thereby achieving excellent optical characteristics.

Table 9 shows the various values of the Embodiments 1, 2, 3 and 4 the values corresponding to the parameters which are specified in the conditions.

TABLE 9

| Conditions | Embodiment 1 | Embodiment 2 | Embodiment 3 | Embodiment 4 |
|---|---|---|---|---|
| f1/f | 0.89 | 0.90 | 0.83 | 1.17 |
| f2/f3 | −0.20 | −0.12 | −0.44 | −0.06 |
| d1/d9 | 1.29 | 1.40 | 1.30 | 1.17 |
| T56 min/d11 | 1.26 | 2.04 | 1.98 | 1.71 |

It is to be understood, however, that even though numerous characteristics and advantages of the present exemplary embodiments have been set forth in the foregoing description, together with details of the structures and functions of the embodiments, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A wide angle lens comprising, from an object side to an image side in sequence: a first lens with a positive refractive power, a second lens with a negative refractive power, a third lens with a positive refractive power, a fourth lens with a negative refractive power, a fifth lens with a positive refractive power, and a sixth lens with a negative refractive power;

the wide angle lens satisfies the following conditions:
$0.80 \leq f1/f \leq 1.50$;
$-0.50 \leq f2/f3 \leq -0.05$;
$1.15 \leq d1/d9 \leq 1.40$;
T56 min/d11 $\geq 0.50$; and
$0.10 \leq Yc62/TTL \leq 0.55$;
$-12.00 \leq f4/f \leq -8.07$;
where
f: a focal length of the wide angle lens;
f1: a focal length of the first lens;
f2: a focal length of the second lens;
f3: a focal length of the third lens;
f4: a focal length of the fourth lens;
d1: an on-axis thickness of the first lens;
d9: an on-axis thickness of the fifth lens;
d11: an on-axis thickness of the sixth lens;
T56 min: a minimum interval distance between an image side surface of the fifth lens and an object side surface of the sixth lens in a direction parallel to an optical axis;
Yc62: a vertical distance between an critical point of an image side surface of the sixth lens and the optical axis; and
TTL: a total optical length from an object side surface of the first lens of the wide angle lens to an image surface of the wide angle lens along the optical axis.

2. The wide angle lens according to claim 1 further satisfying the following condition:
$-5.00 \leq (R1+R2)/(R1-R2) \leq -1.00$;
where,
R1: an on-axis curvature radius of an object side surface of the first lens; and
R2: an on-axis curvature radius of an image side surface of the first lens.

3. The wide angle lens according to claim 2 further satisfying the following condition:
$-2.50 \leq (R1+R2)/(R1-R2) \leq -1.00$.

4. The wide angle lens according to claim 1 further satisfying the following condition:
$-1.00 \leq f1/f2 \leq -0.20$.

5. The wide angle lens according to claim 4 further satisfying the following conditions:
$-0.60 \leq f1/f2 \leq -0.20$.

6. The wide angle lens according to claim 1, wherein, an FNO of the wide angle lens is less than or equal to 2.00.

7. The wide angle lens according to claim 1, wherein, the wide angle lens satisfies the following condition: T56 min/d11$\geq$1.00.

* * * * *